United States Patent [19]

Belling

[11] Patent Number: 4,854,122

[45] Date of Patent: Aug. 8, 1989

[54] AUGMENTOR CURTAIN LINER ASSEMBLY FOR SHARING TENSILE LOADING

[75] Inventor: Paul R. Belling, Stuart, Fla.

[73] Assignee: The United States of America as represented by the Secretary of the Air Force, Washington, D.C.

[21] Appl. No.: 151,373

[22] Filed: Jan. 28, 1988

[51] Int. Cl.⁴ .................................................. F02K 3/10
[52] U.S. Cl. ..................................... 60/261; 60/39.32; 60/752
[58] Field of Search ................. 60/261, 39.32, 752, 60/753; 126/144, 145, 147

[56] References Cited

U.S. PATENT DOCUMENTS

| | | |
|---|---|---|
| 2,544,538 | 3/1951 | Mahnken et al. ..................... 60/752 |
| 2,591,676 | 4/1952 | Clayton, Jr. ......................... 60/39.32 |
| 2,794,319 | 6/1957 | Stockdale . |
| 2,851,854 | 9/1958 | Doll, Jr. . |
| 2,874,536 | 2/1959 | Benson et al. . |
| 2,938,333 | 5/1960 | Wetzler . |
| 3,826,088 | 7/1974 | Nash et al. ............................ 60/261 |

FOREIGN PATENT DOCUMENTS

| | | | |
|---|---|---|---|
| 652094 | 11/1962 | Canada ................................. 60/752 |
| 2074308 | 10/1981 | United Kingdom. .............. 60/39.32 |

*Primary Examiner*—Donald E. Stout
*Attorney, Agent, or Firm*—Robert L. Nathans; Donald J. Singer

[57] ABSTRACT

An improved circumferential segmented augmentor liner assembly anchored to a cylindrical case of a jet engine includes a plurality of liner anchor members affixed to the cylindrical case at circumferentially spaced inside portions thereof, each member having a coupling device for coupling terminal side portions of a pair of adjacent liner segments to the coupling device, along with a plurality of gas pressure equalizing apertures. Side portions of the liner segments are affixed to elongated pins having sufficient lateral resiliency to tend to equalize tensile loads within liner segments.

3 Claims, 2 Drawing Sheets

AUGMENTOR CURTAIN LINER ASSEMBLY FOR SHARING TENSILE LOADING

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of jet engine thrust augmentors.

Curtain liners are used in jet engine augmentors for military aircraft, and are positioned circumferentially about the afterburner or thrust augmentor, to separate the hot core gases from the cooler air flowing between the curtain liners and inside portions of an outer cylindrical engine case. Certain curtain liners divide the augmentor section into liner segments which are anchored to inside portions of the outer case. These circumferential segments will contain relatively high pressure cooling gases, and are thus subject to failure due to localized extremely high gas pressures during engine operation, causing the production of unduly high tensile stress loading within the liners to produce liner failure.

SUMMARY OF THE INVENTION

It is thus an object of the present invention to provide a liner assembly, the preferred embodiment having a plurality of liner anchor members affixed to the inside portions of the cylindrical case at circumferentially spaced portions, each anchor member having an elongated hinge pin passed through the anchor member in a direction parallel to the engine axis, such pin being laterally resilient in directions substantially perpendicular to the engine axis, whereby an increase in the tensile loading of one liner segment causes lateral deflection of the elongated pin, which in turn transmits increased tensile stress to an adjacent liner segment, thereby to provide load sharing between adjacent liner segments to prevent production of the aforesaid unduly high tensile stress therein. The side portions of the adjacent liner segments are configured in the form of interleaved segments which are looped about the common hinge pin. Each anchor member has a plurality of discrete anchor bosses having space therebetween to accommodate the aforesaid interleaved loops of the liner segments which are passed about the common hinge pin. Open spaces are also provided between a number of tandomly positioned anchor elements in order to provide for equalization of gas pressure between one liner segment and an adjacent liner segment.

BRIEF DESCRIPTION OF THE DRAWINGS

Other objects, features and advantages of the present invention will become apparent upon study of the following more specific description taken in conjunction with the drawings in which.

DETAILED DESCRIPTION OF THE PREFERRED EMBODIMENT

Figure 1:
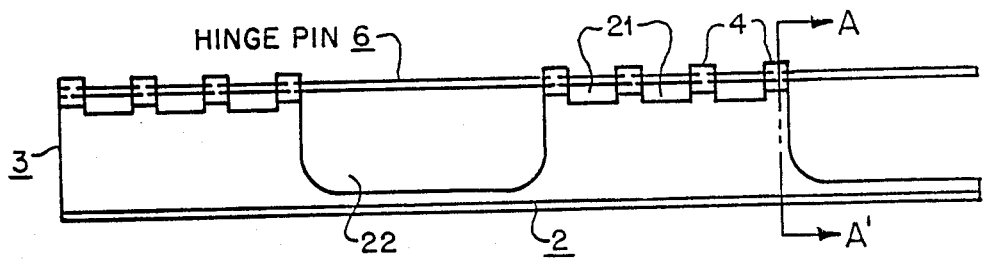
FIG. 1 illustrates a front view of a portion of the anchor means.
Figure 2:
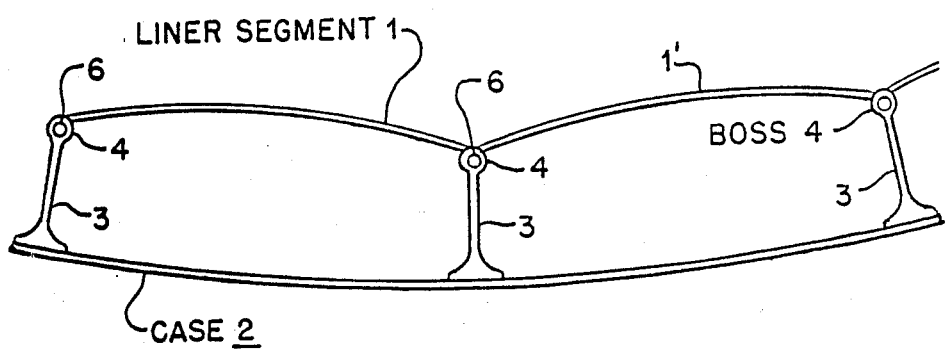
FIG. 2 illustrates a cross-section A—A' taken through a portion of an anchor member of FIG. 1.
Figure 3:
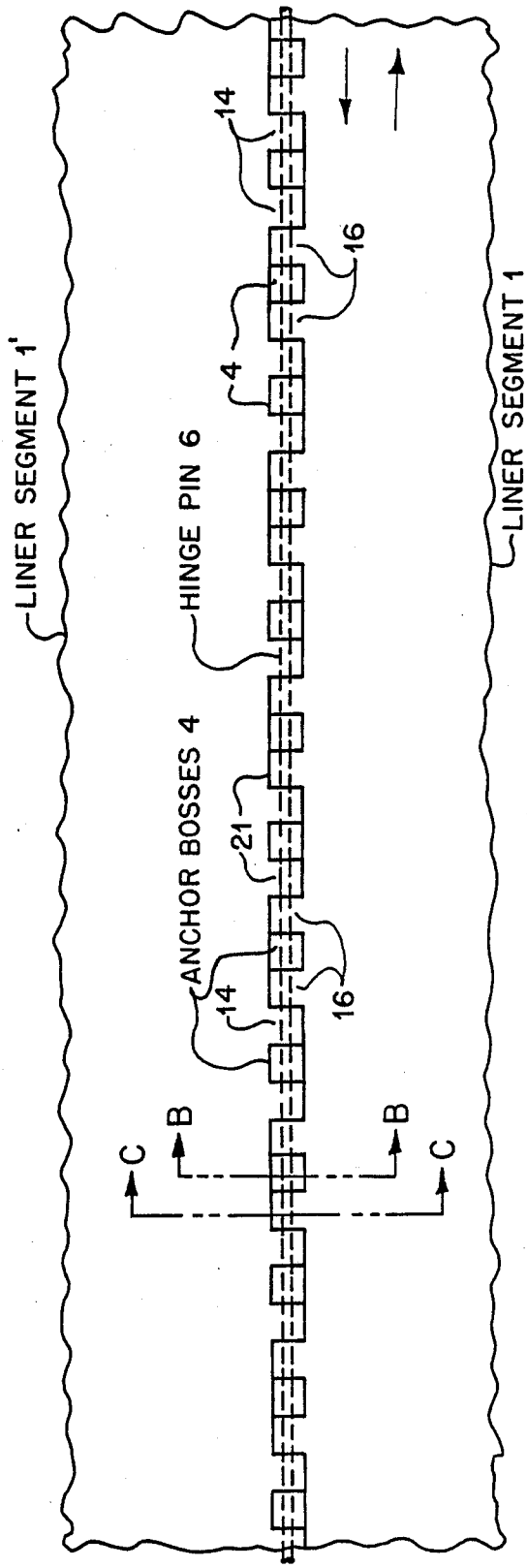
FIG. 3 illustrates a plan view of a portion of the anchor members of FIG. 1.
Figure 5:
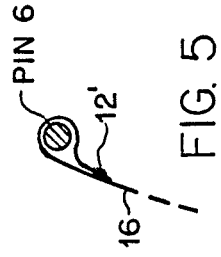
FIGS. 4 and 5 illustrate cross sections through B—B and C—C of FIG. 3.
Figure 4:
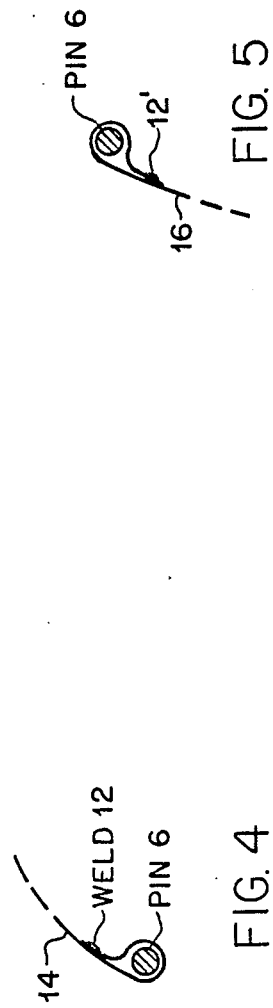

Referring now to FIGS. 1 and 2, a cylindrical case 2 is partially illustrated, having a plurality of anchor members 3 rigidly affixed to the inside surface of case 2. Liner segments 1 and 1' are coupled to anchor members 3 via coupling means, which preferably comprises a plurality of separated bosses having spaces 21 therebetween as illustrated in FIG. 1. A hinge pin 6 is passed through the drilled pin support bosses 4 as shown in FIG. 1, such pin being utilized to rotatively support terminal portions of adjacent liner segments 1 and 1' as illustrated in FIG. 3. Each terminal portion or loop segment 14 at the side of liner segment 1' is wrapped about pin 6 and weld 12 is utilized to close the loop as illustrated in FIG. 4, affixing each loop to pin 6. Adjacent liner segment 1 has terminal loop portions 16, which are passed about pin 6 and welded at 12' to terminal portion 16 of liner segment 1 as illustrated in FIG. 5. Thus the terminal loop portions of the liner segments are interleaved as best illustrated in FIG. 3 and looped about the common hinge pin 6 somewhat in the manner of an elongated piano hinge. The loops may be affixed to the leading pin portion as the pin is passed through the anchor members and across gaps 22 separating each anchor member 3. Thus interleaved loop terminal portions will be present within the spaces 21 formed by the discrete separated bosses 4 of FIG. 1, and also between the larger spaces 22 between anchor members. In summary, hinge pin 6 is passed all of the way through all of the drilled bosses of the tandomly positioned anchor members 3 and the interleaved loops of the terminal side portions of segment 1 and 1' welded in place about common hinge pin 6. The hinge pin 6, the tandomly positioned anchor members 3, and the aforesaid interleaved loops fastened about pin 6, extend for the entire length of the augmentor in a direction parallel to the engine axis. This structure is, of course, repeated as indicated in FIG. 2 all of the way around the inside of the cylindrical case surrounding the interior or the jet engine augmentor.

It is an important feature of the invention that hinge pin 6 be laterally resilient in directions substantially perpendicular to the longitudinal engine axis. Let it be assumed that the gas pressure beneath liner segment 1 of FIG. 2 sharply increases to increase the tensile stress within segment 1. This action causes hinge pin 6 to be deflected slightly to the left which in turn causes the tensile stress in adjacent liner segment 1' to be increased, thereby enabling the sharply increased tensile loading of segment 1 to be shared by adjacent segment 1'. This process, of course, would continue all of the way around the inside portions of the liner assembly surrounding the cylindrical core section of the jet augmentor. Should the gas pressure beneath right-hand segment 1' be sharply increased, the pin 6 would be deflected in the opposite direction to the right, thereby to increase tensile stress within liner segment 1.

A plurality of tandomly positioned anchor members 3 thus make up one of the anchor means of the invention. A substantial plurality of the anchor means, circumferentially extend all of the way around the interior of the cylindrical engine case. Openings 22 are formed between the two discrete anchor members 3, along with openings 21 as illustrated in FIG. 1, all of which aid in equalizing gas pressures beneath adjacent liner segments, to also tend to reduce liner failure due to pressure extremes under any one particular liner segment. While particular embodiments of the present invention have been shown and described, it is apparent that various changes and modifications may be made, and it is therefore intended that the following claims cover all such modifications and changes as may fall within the true spirit and scope of this invention.

What is claimed is:

1. In a jet engine having a longitudinal engine axis, an improved circumferential segmented augmentor liner assembly anchored to a cylindrical case of said engine comprising:
    (a) a plurality of liner anchor means affixed to said cylindrical case at circumferentially spaced inside portions thereof, each anchor means having coupling means for coupling terminal side portions of a pair of adjacent liner segments to said anchor means along the length thereof extending parallel to said engine axis; and
    (b) wherein said coupling means comprises hinge pin means including at least one elongated pin laterally resilient in directions substantially perpendicular to said longitudinal engine axis for supporting terminal side portions of said adjacent liner segments; and
    (c) wherein each anchor means includes a plurality of discrete pin support means having spaces therebetween for permitting side portions of said liner segments to be coupled 2. The liner assembly of claim 1 wherein terminal side portions of adjacent liner segments are looped about said elongated pin.

3. The liner assembly of claim 1 wherein said side portions are configured in the form of interleaved loop segments positioned about said elongated pin.

* * * * *